US008591171B1

(12) United States Patent
Maynard

(10) Patent No.: US 8,591,171 B1
(45) Date of Patent: Nov. 26, 2013

(54) OPEN-FLOW VERTICAL WIND GENERATOR

(76) Inventor: Mark Maynard, Easthampton, MA (US)

(*) Notice: Subject to any disclaimer, the term of this patent is extended or adjusted under 35 U.S.C. 154(b) by 607 days.

(21) Appl. No.: 12/806,695

(22) Filed: Aug. 19, 2010

Related U.S. Application Data

(60) Provisional application No. 61/274,855, filed on Aug. 21, 2009.

(51) Int. Cl.
 *F03D 3/00* (2006.01)
(52) U.S. Cl.
 USPC .............................. 415/4.2; 415/4.4; 415/907
(58) Field of Classification Search
 USPC .................. 415/4.2, 4.4, 907, 909, 208.1
 See application file for complete search history.

(56) References Cited

U.S. PATENT DOCUMENTS 5,380,149 A * 1/1995 Valsamidis ..................... 415/2.1
6,465,899 B2 10/2002 Roberts
6,740,989 B2 5/2004 Rowe
2008/0131281 A1* 6/2008 Kariya ........................... 416/183
2009/0289459 A1* 11/2009 Chung ............................ 290/55

* cited by examiner

*Primary Examiner* — Edward Look
*Assistant Examiner* — Maxime Adjagbe
(74) *Attorney, Agent, or Firm* — Malcolm J. Chisholm, Jr.

(57) ABSTRACT

The generator (10) includes an essentially cylindrical stator assembly (12) defining a central turbine void (14) in which a wind turbine (16) rotates to power an electrical generator (18). The wind turbine (16) includes vanes (48) having a width (52) less than 25 percent of a diameter (58) of the turbine (16). The turbine (16) defines an open void (60) between the vanes (48) for unrestricted passage of air through the wind turbine (16). Non-planar stators (34A-34H) extend between a base and an upper truss (20, 26) to strengthen the stator assembly (12) and to direct air exiting directional ducts (36A-36H) to move in a first rotational direction (42) within the turbine void (14). A plurality of geodesic truss segments (96A-96H) form the base and upper trusses (20, 26) to produce a strong, light-weight wind generator (10) that is easily assembled on-site.

13 Claims, 5 Drawing Sheets

OPEN-FLOW VERTICAL WIND GENERATOR

CROSS REFERENCE TO RELATED APPLICATION

This Application claims the benefit of U.S. Provisional Patent Application Ser. No. 61/274,855 that was filed on Aug. 21, 2009, entitled "Self-Regulating Vertical Wind Turbine".

DESCRIPTION

This disclosure relates to wind generators for generating electricity and in particular relates to an open-flow vertical wind generator that utilizes structural features to enhance structural integrity, ease of manufacture and assembly, and efficiency of operation of the generator.

BACKGROUND ART

It is known that wind generators are increasingly used for non-polluting production of electricity. Most wind generators utilize spinning blades similar to an airplane propeller supported on a post high above any buildings or nearby tree line. The resulting rotational force on an axle of the blade-type of wind generator or turbine rotates the axle about an axis horizontal to the ground or support surface to generate electricity. These wind generators need complicated and costly mechanisms to allow them to rotate so that the blades face the on-coming wind, and need additional "governor" types of apparatus to prevent them from over spinning in high winds resulting in damage to the machinery.

Other wind generators are known to utilize cylindrical shapes having turbine vanes or rotors extending from the cylinder to catch the wind and thereby rotate about an axis vertical to the ground or support surface to produce electricity. Such vertical wind generators typically involve enormous mass to produce any significant amount of electricity, and also require complicated, costly mechanisms to prevent over spinning. It is known that such vertical wind generators have advantages of rotating in response to varying wind directions; not needing a tall mounting post so they can be located at ground or roof level for easy access; rotating at relatively low wind speeds; and minimizing damage resulting from strong cross-winds.

For example, U.S. Pat. No. 6,740,989 to Rowe shows a common "vertical axis wind turbine" having stator vanes rigidly secured to define a cylinder and having a turbine rotatably secured within a void in the cylinder. Wind is directed by the rigid stator vanes to impact the turbine rotors in a predetermined direction of rotation, and an axle of the turbine rotates an electricity generator. Other common vertical wind generators are also well known and characterized variously as having "articulating rotors", "egg-beater rotors", "egg-whisk-shaped wind turbines", "spiral-shaped rotors", "Darrieus-type rotors", "spiral air foil rotors", "helix-shaped, stator free rotors", etc.

Unfortunately, none of these types of wind generators has achieved wide-spread commercial success, and virtually all known vertical wind generators involve such enormous complexities in manufacturing, assembly, overall costs thereof and efficiency of operation that they do not produce electricity at competitive costs compared to large horizontal wind generators, solar electricity generators, and other known sources of electricity.

SUMMARY OF THE DISCLOSURE

The inventor herein has determined that vertical wind generators known to date do not work with substantial overall efficiency for several primary reasons. First, vertical wind generators of the type shown in Rowe utilize rotational turbine vanes secured within stationary stators extending between top and bottom frames that provide structural integrity to the generator. The turbine vanes in Rowe and in many similar vertical wind generators define open air inlets that have closed opposed air outlets that are secured to a central cylinder or axle. Such an arrangement is common in steam turbine designs. However, where no suction forces are generated on down stream faces of the stators, the closed flow of such designs dramatically diminishes the force of the wind acting upon the rotary vanes. As wind-driven air enters the air inlets on upstream faces of the stators of such closed turbines, the air within the turbine is compressed and increases in pressure as the turbine rotates until the air is permitted to exhaust through the air inlets on the downstream side of the turbine. Because the air within the upstream side of the turbine is compressed, it is at a higher pressure than the wind, and hence much of the wind driven air does not enter the air inlet to impact the turbine blade.

Additionally, known vertical wind generators must be of very large diameters to produce a meaningful amount of electricity. Unfortunately, such large turbines raise transportation costs beyond 30 percent of overall costs because they must be transported as wide-loads, or on trains having limited access, or be manufactured near a proposed usage site. Further, as vertical wind generators increase in size and therefore weight, they require additional, high-strength structural components to withstand storm-wind conditions. Such components necessarily result in the generators increasing in costs and decreasing in operating efficiency so that the generators are simply not cost-effective. The present inventor's exhaustive experimentation in wind generator design uncovered these and many related problems and produced in the present disclosure an effective and efficient solution to these many challenges.

The disclosure is an open-flow wind generator for generating electricity that includes an essentially cylindrical stator assembly defining a central turbine void in which a wind turbine rotates to mechanically rotate an electrical generator. The stator assembly includes a base truss having a top surface and an opposed bottom surface, and upper truss having a top surface and opposed bottom surface. A plurality of non-planar stators are secured to and extend between the top surface of the base truss and the bottom surface of the upper truss. The plurality of non-planar stators define a plurality of directional ducts between the stators. The directional ducts are also configured to direct wind passing through the ducts across the non-planar stators from an exterior perimeter of the stators to an interior perimeter of the stators, so that the wind flows out of the directional ducts in a first rotational direction. Additionally, the interior perimeters of the stators define the central turbine void.

The wind turbine is rotatably secured within the central turbine void and has a bottom surface and an opposed top surface. A plurality of vanes extends between the bottom surface and the top surface, and the wind turbine is configured so that the plurality of vanes are positioned adjacent exits of the directional ducts so that wind passing out of the directional ducts impacts the vanes to rotate the wind turbine in the first rotational direction. The plurality of vanes are also constructed to extend in a width direction perpendicular to an axis of rotation of the turbine from adjacent an exterior perimeter of the wind turbine toward a center of the wind turbine a distance that is no greater than 25 percent of a diameter of the wind turbine. Additionally, the wind turbine defines an open void including the center of the wind turbine and that extends between interior edges of the plurality of vanes. An electrical generator is secured to the wind turbine for generating electricity upon rotation of the wind turbine.

The open-flow vertical wind generator effectively permits virtually all of the force of passing wind-driven air to impact the rotational vanes of the wind turbine. That is because, after the wind impacts the turbine vanes, that have a relatively small width, the air passes unimpeded into the open void of the turbine and then across the downstream turbine blades and into downstream directional ducts of the stator assembly. Air that has been slightly compressed passing through the upstream directional ducts may then decompress through expansion in the downstream directional ducts as the air passes out of the generator.

The width of the turbine vanes is less than 25 percent of the diameter of the wind turbine to reduce restriction of air from the compression of the air as the air moves into the central turbine void. A total surface area of the turbine vanes exposed to the impact air to act upon is maximized by using additional narrow vanes. These narrow vanes also minimize restriction of air flow due to compression of air within the directional ducts and within the wind turbine. Air passing adjacent the generator also serves to apply a suction force upon the air within the downstream directional ducts resulting in flow detachment of the air passing out of the generator.

Consequently, because of the open-flow design of the present vertical generator, the air leaving the generator is effectively sucked out of the open void and downstream directional ducts of the generator. This provides for maximizing the force of the wind-driven air that impacts the turbine vanes, thereby substantially enhancing the efficiency of the generator.

Because the stators are non-planar, they also add enormous structural integrity to the overall generator configuration. For example, if the open-flow vertical generator was positioned on top of a flat roof of a large building, it would necessarily be exposed to various non-linear vertical loads, such as twisting downward forces resulting from cross winds, and/or roof-structure generated wind eddy forces, etc. Because the stators are non-planar and define a folded or concave surface to direct wind-driven air in the first rotational direction, the stators effectively provide vertical and lateral support between the top and bottom trusses. (It is pointed out that for purposes herein, the phrase "non-planar stators" means that the stator surfaces may be curved surfaces, may be two or more folded planar surfaces wherein a bend axis of the fold or folds extends between the bottom and top trusses, or any combinations thereof.

In a preferred embodiment, the non-planar stators define a minimum curve or depth-of-bend. For purposes herein, the minimum non-planar depth-of-bend of the non-planar stators is at least 25 percent of a shortest or width distance between the exterior perimeter and interior perimeter of the stator. For example, if a shortest width distance between exterior and interior perimeters of a stator is 12 inches (1 foot), then the depth-of-bend must be at least 3 inches away from a plane defined between the exterior and interior perimeters, wherein the plane extends above the concave, non-planar surface of the stator.

In another embodiment, the open-flow vertical wind generator defines a sound-dampening void between the interior perimeters of the stators and the vanes of the wind turbine. It has been found that the closer the vanes are to the interior perimeters of the stators the greater a noise generated by the rotation of the wind turbine. Additionally, because of the open-flow turbine design, defining a sound-dampening void between the stators and the vanes does not decrease efficient operation of the wind turbine. Optimally, a length of the sound-dampening void is about than 5 percent of the diameter of the wind turbine. (For purposes herein, the word "about" is to mean plus or minus 10 percent.)

In yet a further embodiment, the base truss and the upper truss are each manufactured of a plurality of modular geodesic truss segments. (For purposes herein, the word "geodesic" is to mean a generalization of the notion of applying a straight line to curved spaces.) In an exemplary embodiment, each of the base and upper trusses are formed by securing together eight virtually identical geodesic truss segments, wherein each segment is in a shape of a four-sided quadrilateral trapezoid. Each truss segment includes a perimeter frame of thin, high tensile-strength material such as extruded channel aluminum beams. This perimeter frame is capped by a flat, light plate of the same perimeter dimensions as the frame, such as aluminum sheet plate, that is secured to the frame. Eight such geodesic truss segments may be configured so that when they are secured adjacent each other, they form an octagon-shaped truss. If the high-tensile strength material is channel aluminum or other suitable metal, an open side of the channel-shaped, four-sided, rectangular material faces inward toward opposed segments of the perimeter frame so that bolting adjacent truss segments together only requires passing bolts through one surface of the channel aluminum frame material of each geodesic truss.

By forming the base and upper trusses of such high-strength, light-weight geodesic truss segments, the present open-flow vertical wind generator can be easily transported from a manufacturing site to an assembly location on standard trucks, and in most instances delivered to roof tops along standard stairways and freight elevators in a disassembled form. The geodesic ring truss segments can then be bolted together and have the relatively flat, non-planar stators secured between the trusses at the installation site to form the largest part of the generator. A particular embodiment has demonstrated great ease of assembly and efficient production of 5 kilowatts ("kW") in winds between 22 and 25 miles per hour ("mph") where a diameter of the base and upper trusses is about 10 feet.

Further refinement of the open-flow vertical wind generator has demonstrated maximum efficiency where the wind turbine defines a ratio of a number of wind turbine vanes divided by a number of stators that is greater than 1.25.

Consequently, there is a need for a high strength, low weight, easily transportable vertical wind generator that produces electricity at a cost that is competitive with known electricity generators.

PREFERRED EMBODIMENTS OF THE DISCLOSURE

Figure 1:
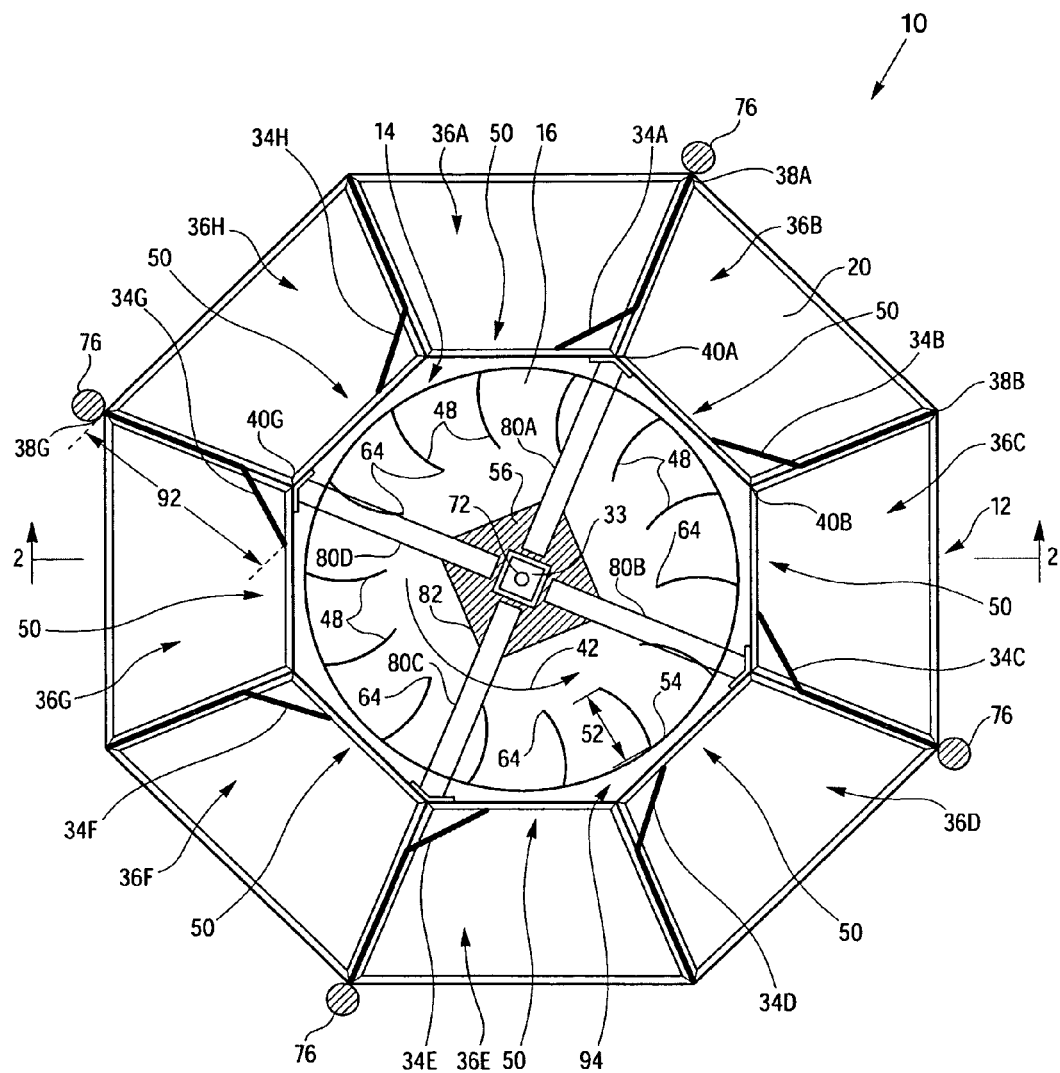
FIG. 1 is a cross-sectional, top plan view of an open-flow vertical wind generator constructed in accordance with the present disclosure.

Referring to the drawings in detail a top plan view of an open-flow vertical wind generator for generating electricity is shown in FIG. 1, and is generally designated by the reference numeral 10. The open-flow vertical wind generator 10 includes an essentially cylindrical stator assembly 12 defining a central turbine void 14 in which a wind turbine 16 rotates to mechanically rotate an electrical generator 18 (shown only in FIG. 2).

Figure 2:
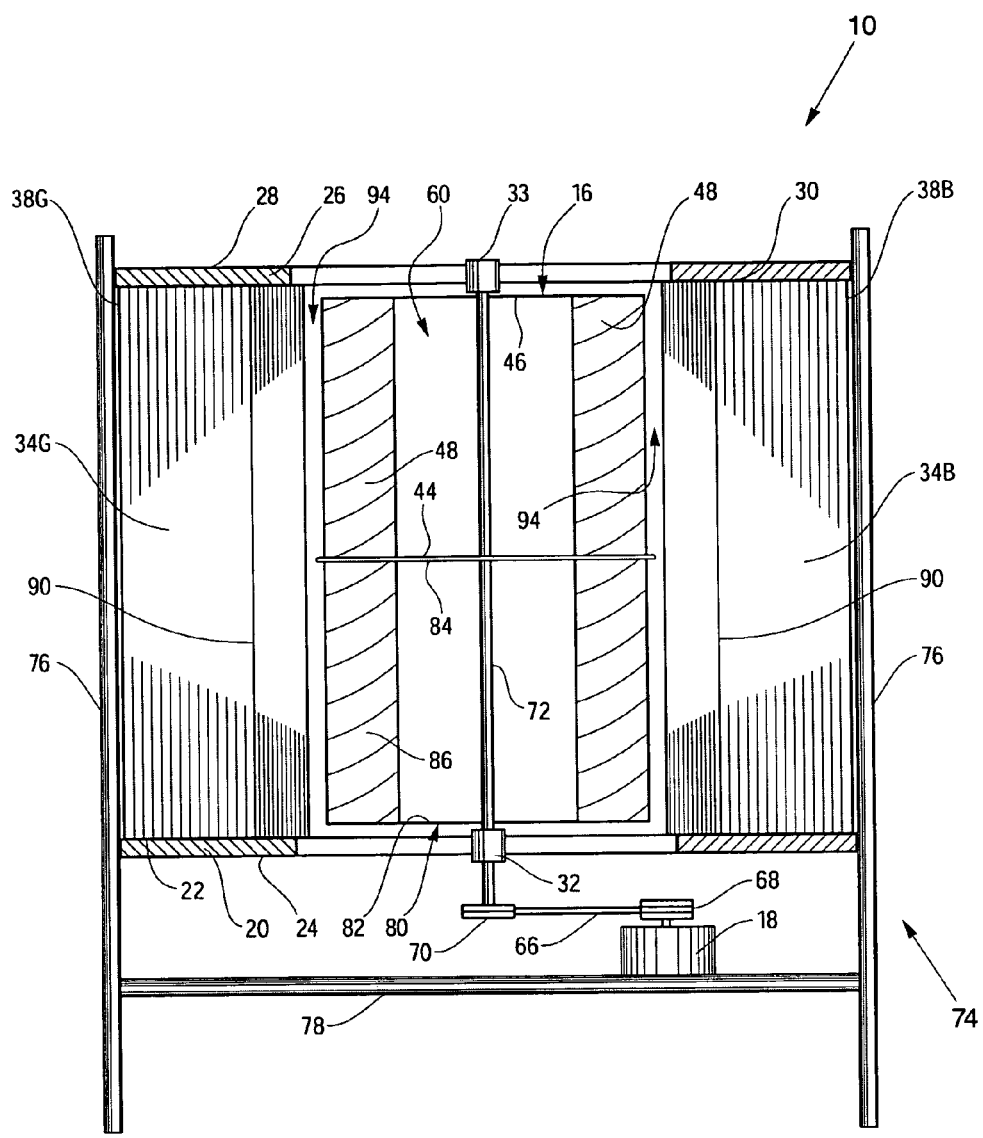
FIG. 2 is a cross-sectional, side plan view shown along sight line 2-2 of the open-flow vertical wind generator of FIG. 1.

As shown best in FIGS. 1 and 2, the stator assembly 12 includes a base truss 20 having a top surface and an opposed bottom surface 24, and upper truss 26 having a top surface 28 and opposed bottom surface 30. The bottom truss 20 may also include a bottom bearing 32, and the top truss may include a top bearing 33. A plurality of stators 34A, 34B, 34C, 34D, 34E, 34F, 34G, 34H ("34A-34H") are secured to and extend between the top surface 22 of the base truss 20 and the bottom surface 30 of the upper truss 26. In a preferred embodiment, the stators 34A-34H are non-planar. The plurality of non-planar stators 34A-34H define a plurality of directional ducts 36A, 36B, 36C, 36D, 36E, 36F, 36G, 36H ("36A-3H") between the stators 34A-34H and the base truss 20 and upper truss 26. The directional ducts 36A-36H are also configured to direct wind passing through the ducts 36A-36H across the non-planar stators 34A-34H from exterior perimeters 38A, 38B, 38G (for purposes of clarity of the drawing, only non-planar stators 34A, 34B and 34G will have reference numerals for exterior and interior perimeters, while it is to be understood that other stators have similar exterior and interior perimeters) of the non-planar stators 34A-34H to interior perimeters 40A, 40B and 40G of the stators 34A-34H, so that the wind flows out of the directional ducts 36A-36H in a first rotational direction 42 as represented by directional arrow 42 in FIG. 1. Additionally, the interior perimeters 40A, 40B, and 40G of the non-planar stators 34A-34H define the central turbine void 14.

The wind turbine 16 is rotatably secured within the central turbine void 14 and has a bottom surface 44 and an opposed top surface 46. A plurality of vanes 48 extends between the bottom surface 44 and the top surface 46, and the wind turbine 16 is configured so that the plurality of vanes 48 are positioned adjacent exits 50 of the directional ducts 36A-36H so that wind passing out of the directional ducts impacts the vanes 48 to rotate the wind turbine in the first rotational direction 42. The plurality of vanes 48 are also constructed to extend in a width direction 52 (shown in FIG. 1) perpendicular to an axis of rotation of the turbine from adjacent an exterior perimeter 54 of the wind turbine toward a center 56 of the wind turbine 16 a distance that is no greater than 25 percent of a diameter 58 (shown in FIG. 3) of the wind turbine 16. Additionally, the wind turbine 16 defines an open void 60 including a center 62 of the open void and wherein the open void 60 extends between interior edges 64 of the plurality of vanes 48.

The electrical generator 18 is secured to the wind turbine 16 for generating electricity upon rotation of the wind turbine 16. The electrical generator 18 may be secured to the wind turbine 16 by connecting means for connecting the wind turbine to the electrical generator, such as by a belt or chain 66 secured between a generator drive gear 68 and a wind turbine drive gear 70 secured to a central axle 72 of the wind turbine 16, as shown in FIG. 2. Any other known connecting means for connecting a rotating axle to an electrical generator may also comprise the connecting means, such as hydraulic connections (not shown), magnetic connections (not shown), etc.

Figure 3:
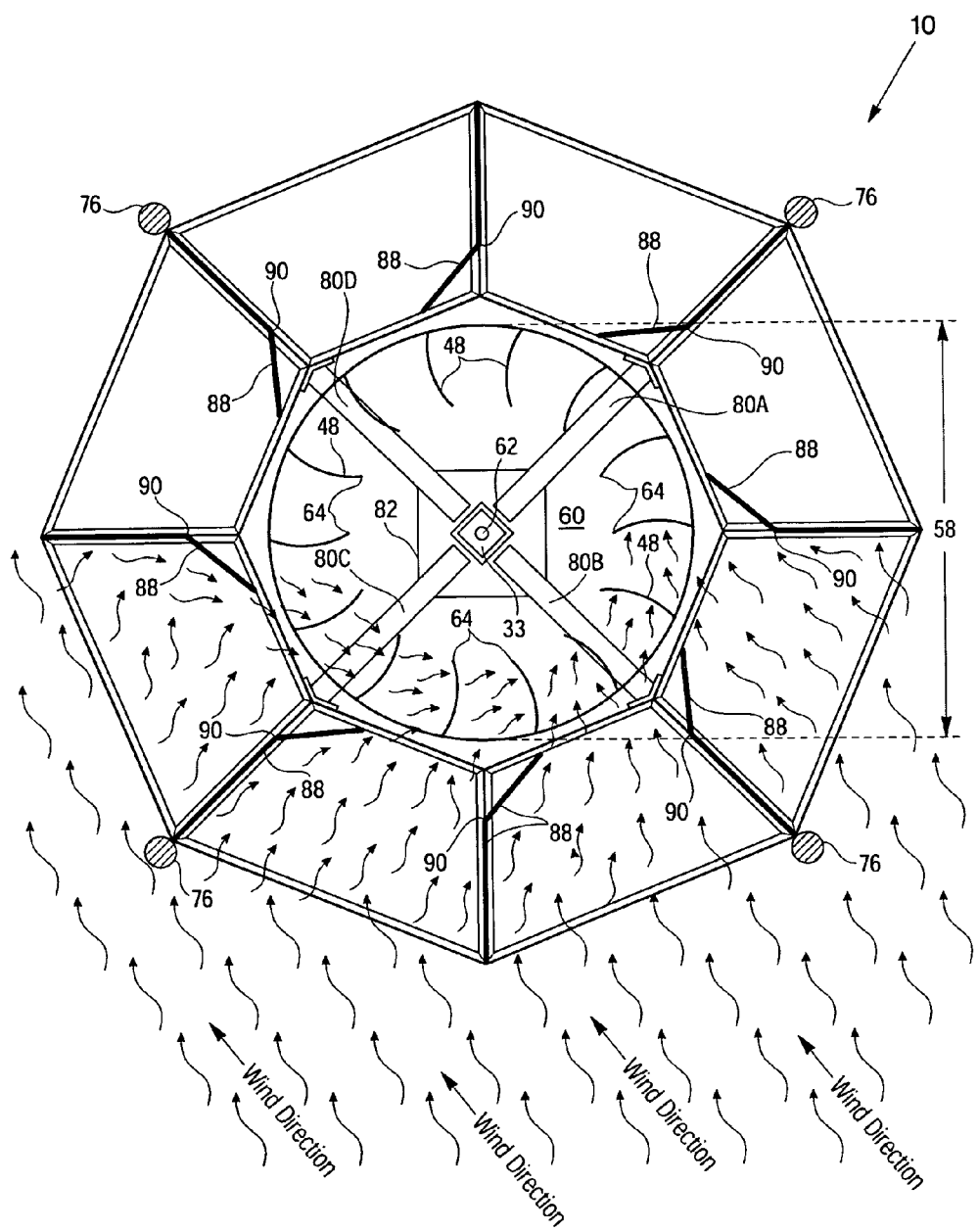
FIG. 3 is a top plan view of the FIG. 1 open-flow vertical wind generator showing wind directional arrows and a first rotation direction.

The open-flow vertical wind generator 10 may be assembled to be integral with a support structure, such as a large flat roof, stacking with identical generators 10 (stacking not shown), etc. Alternatively, the vertical wind generator 10 may be supported in a support frame 74 having support legs 76 and cross support struts 78. The open-flow vertical wind generator 10 may also include turbine support means for rotatably securing the wind turbine 16 within the central turbine void 14. Such turbine support means may include turbine support struts 80A, 80B, 80C, 80D ("80A-80D"), secured across the central turbine void 14 defined in the both the bass truss 20 and upper truss 26, as shown in FIGS. 1 and 3. The turbine support struts 80A-80D may be joined by a strut plate (shown in FIGS. 1 and 3 only in the upper truss 26) that also secures the top bearing 33 and bottom bearing 32 for rotatably securing the turbine axle 72 within the central turbine void 14.

FIG. 2 shows that the wind turbine 16 may be secured within the central turbine void 14 of the stator assembly 12 as a first wind turbine 16 and that a second, virtually identical wind turbine 80 having a bottom surface 82 and an opposed top surface 84 and a plurality of vanes 86 may also be secured with in the central turbine void 14 so that both wind turbines 16, 80 share the turbine axle 72. Additionally, the stator assembly 12 may be constructed of large, stationary, strong materials so that more wind turbines 16, 80 may be secured within the central turbine void 12. Also, the open-flow vertical wind turbine 10 may be constructed so that it is joined to other, virtually identical open-flow wind turbines (not shown) in a large stack to share a common axis, or simply to be exposed to favorable wind conditions, such as within a wind-turbine warehouse (not shown) in a location of continuously high winds, such as at sea coasts, etc.

As described above, the open-flow vertical wind generator 10 effectively permits virtually all of the force of passing wind-driven air to impact the rotational vanes 48 of the wind turbine 16. That is because, after the wind impacts upstream turbine vanes 48, that have a relatively small width 52, the air passes unimpeded into the open void 60 of the turbine 16 and then across downstream turbine blades 48 and into downstream directional ducts 36A-36H of the stator assembly 12. Air that has been slightly compressed passing through the upstream directional ducts 36A-36H may then decompress through expansion in the downstream directional ducts 36A-36H as the air passes out of the generator 10. Air passing adjacent the vertical generator 10 also serves to apply a suction force upon the air within the downstream directional ducts 36A-36H resulting in flow detachment of the air passing out of the vertical generator 10.

Consequently, because of the open-flow design of the present vertical generator 10, the air leaving the vertical generator 12 is effectively sucked out of the open void 60 of the turbines 16, 80 and downstream directional ducts 36A-36H of the generator 10. This provides for maximizing the force of the wind-driven air that impacts the turbine vanes 48 to enhance operating efficiencies of the vertical generator 10.

The non-planar stators 34A-34H also add enormous structural integrity to the overall vertical generator 10 configuration. Because the stators 34A-34H are non-planar and define a folded or concave surface 88 (reference numerals 88 shown in FIG. 3) to direct wind-driven air in the first rotational direction 42, the stators 34A-34H effectively provide vertical and lateral support between the base truss 20 and upper truss 26. (It is stressed again that that for purposes herein, the phrase "non-planar stators 34A-34H" means that the stator surfaces 88 may be curved surfaces, may be two or more folded planar surfaces wherein a bend axis 90 (shown in FIG.

3) of the fold extends between the base truss 20 and upper truss 26, or any combinations thereof.

The non-planar stators 34A-34H may define a minimum depth of curve or depth-of-bend. For purposes herein, an optional minimum non-planar depth-of-bend of the stators 34A-34H is at least 25 percent of a shortest or width distance 92 between the exterior perimeter 38A, 38B, 38G and interior perimeter 40A, 40B, 40G of the non-planar stators 34A-34H. (The width distance 92 of the non-planar stators is shown in FIG. 1 with respect to the exterior and interior perimeters 38G, 40G of non-planar stator 34G.) For example, if a shortest width distance 92 between exterior and interior perimeters 38G, 40G of stator 34G is 12 inches (1 foot), then the depth-of-bend must be at least 3 inches away from a plane defined along the shortest distance between the exterior and interior perimeters 38G, 40G of the stator 34G, wherein the plane extends above the concave, non-planar surface of the non-planar stator 34G.

The open-flow vertical wind generator 10 may also define a sound-dampening void 94 between the interior perimeters 40A, 40B, 40G of the non-planar stators 34A-34H and the vanes 48 of the wind turbine 16. It has been found that the closer the vanes 48 are to the interior perimeters 40A, 40B, 40G of the stators 34A-34H, the greater a noise generated by the rotation of the wind turbine 16. It is preferred that a length of the sound dampening void 94 is at least 3 percent of the diameter 58 of the wind turbine 16 or of the central turbine void 14.

Figure 4:
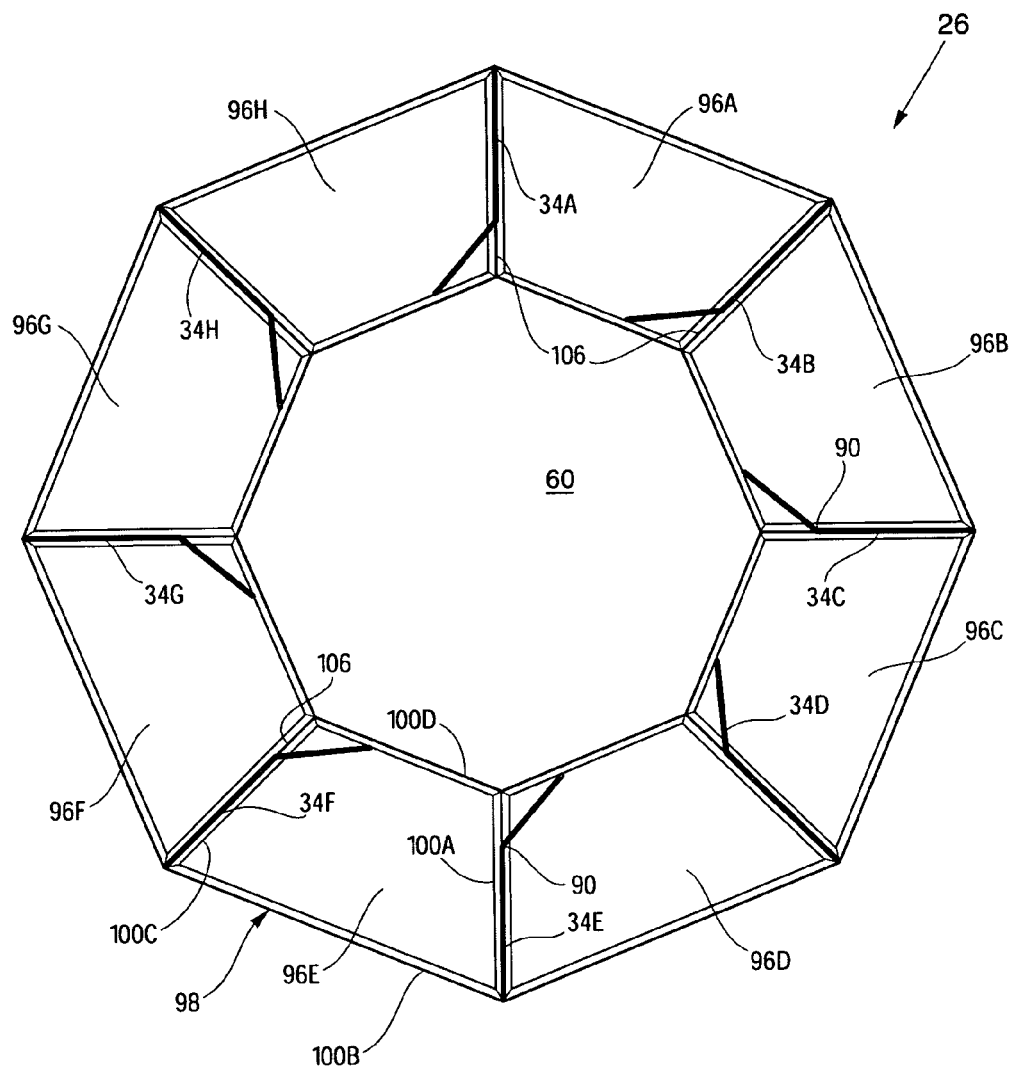
FIG. 4 is a top plan view of a base truss and a plurality of stators secured to the truss, wherein the truss is made of eight virtually identical geodesic truss segments.
Figure 5:
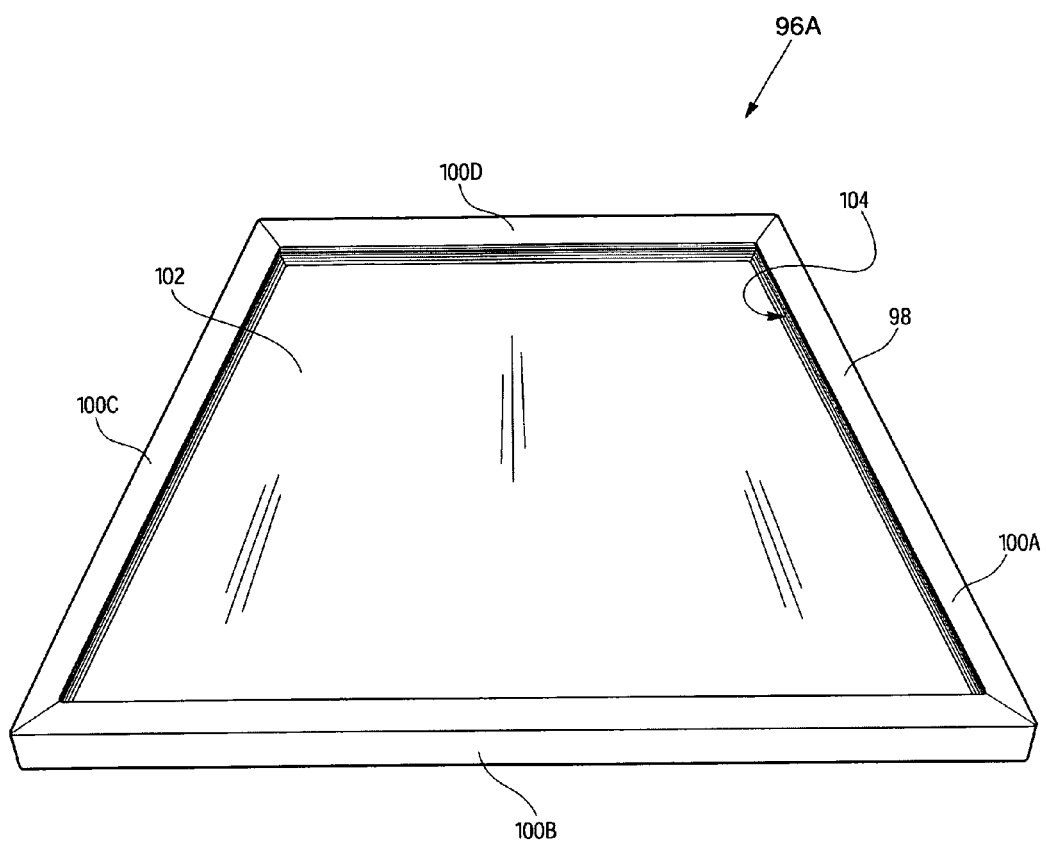
FIG. 5 is a top plan view of a geodesic truss segment in the form of a quadrilateral trapezoid.

As shown in FIGS. 4 and 5, the base truss 20 and the upper truss 26 may each be manufactured of a plurality of modular geodesic truss segments 96A, 96B, 96C, 96D, 96E, 96F, 96G, 96H ("96A-96H"). (For purposes herein, the word "geodesic" is to mean a generalization of the notion of applying a straight line to curved spaces.) In the exemplary embodiment, shown in FIG. 4 the base 20 and upper truss 26 (not shown) are formed by securing together eight virtually identical geodesic truss segments 96A-96H, wherein each segment is in a shape of a four-sided quadrilateral trapezoid, as shown in the single truss segment 96A shown in FIG. 5. Each truss segment includes a perimeter frame 98 consisting of one or more folded frame members 100A, 100B, 100C, 100D, 100E ("100A-100E") that may be a single integral unit or individual segments 100A-100E secured together to form the perimeter frame 98 of the geodesic truss segment 96A. By the phrase, "folded frame member" 100A-100E, it is meant that a frame material is folded longitudinally to enhance tensile strength of the frame 98 or frame segment 100A-100E. A preferred folded frame member 100A-100E is extruded channel aluminum.

The perimeter frame 98 is preferably capped by a flat, light plate 102 of the same perimeter dimensions as the overall truss segment 94A defined by the frame 98. An exemplary cap for the truss segment is aluminum sheet plate. As shown in FIG. 5, each geodesic truss segment 96A-96H may be in the form of a quadrilateral trapezoid, and configured so that by securing eight such geodesic truss segments 96A-96H they form an octagon-shaped circle or ring, such as the base truss 20. It is stressed however, that the phrase geodesic truss segment 96A-96H means each segment may be of any perimeter dimensions wherein the geodesic truss segments 96A-96H can be secured adjacent each other to form a stator-supporting ring. Preferably each geodesic truss segment 96A-96H also includes the aforesaid folded frame member 98 and overlying plate 102. By utilizing a plurality of modular, or virtually identical geodesic truss segments 96A-96H, manufacture of the wind generator 10 is extraordinarily efficient because it is made of easily manufactured small parts rather than large, costly components that are difficult to make and transport.

If the folded frame member 98 is manufactured of a three-sided channel material, an open side or channel valley 104 is preferably configured to face into a middle of the truss segment 96A. By this arrangement, bolting adjacent truss segments 96A-96H together only requires passing bolts (not shown) through one surface of the folded frame member 98 of each geodesic truss segment 96A-96H.

The present disclosure also includes methods of assembly at a site of an end-user of the open-flow vertical wind generator 10. By forming the base truss 20 and upper truss 26 of such high-strength, light-weight geodesic truss segments 96A-96H, the present vertical wind generator 10 can be easily transported from a manufacturing site to an assembly location on standard trucks (not shown), and in most instances delivered to roof tops up standard stairways and freight elevators (not shown) in a disassembled form. The geodesic truss segments 96A-96H can then be bolted together and have the relatively flat, non-planar stators 34A-34H secured between the trusses 20, 26 at the installation site to form the largest part of the open-flow wind vertical generator 10. In a further preferred embodiment, as shown in FIGS. 1, 3 and 4, the non-planar stators 34A-34H may be secured between the base truss 20 and upper truss 26 so that the stators 34A-34H overlie seams 106 between adjacent geodesic truss segments 96A-96H. This provides for further enhanced structural integrity or strength of the overall stator assembly 12 and open-air vertical wind turbine 10.

A particular embodiment constructed of the preferred embodiments described above has demonstrated ease of assembly on an urban rooftop and efficient production of 5 kW in winds between 22 and 25 miles per hour ("mph") where a diameter of the base and upper trusses is ten feet. Yearly production from this generator exceeds about 24,000 kW per year.

Further refinement of the open-flow vertical wind generator 10 has demonstrated maximum efficiency where the generator 10 defines a vane 48 to stator 34A-34H ratio of a number of wind turbine 16 vanes 48 divided by a number of stators 34A-34H that is greater than 1.25. For example, if the number of wind turbine vanes 48 is 14, and the number of non-planar stators 34A-34H is 8 (as shown in FIGS. 1, 3 and 4), then the vane to stator ratio is 1.75.

The present open-flow vertical wind generator 10 is especially appropriate to satisfy increasing demands for de-centralized, environmentally friendly, efficient and inexpensive production of electricity. The generator 10 can be readily located on top of the many flat roofs in modern urban environments and efficiently produces electricity in modest winds common to urban rooftops (not shown). Similarly, large, flat-roof "big box" stores in suburban plazas and malls are likewise appropriate for installation of a substantial number of virtually identical wind generators 10 in both stacked, and/or side-by-side arrays (not shown). It is stressed that the wind generator 10 efficiently produces electricity irrespective of wind direction, and is not detrimentally affected by high wind speeds. Because a rate of flow of air through the generator 10 is limited and increasing air flow passing by the generator 10 effects a drag force on the generator 10, the wind turbine 16 is not susceptible to over-spinning, and is by its structure self-regulating. Additionally, locating the present vertical wind generator in urban and suburban areas where electricity is utilized decreases a cost of transmitting generated electricity long distances, unlike requirements for remote mountaintop windmills.

While the present disclosure has been presented above with respect to the described and illustrated embodiments of an open-flow vertical wind generator (10), it is to be understood that the disclosure is not to be limited to those alternatives and described embodiments. Accordingly, reference should be made primarily to the following claims rather than the forgoing description to determine the scope of the disclosure.

What is claimed is:

1. An open-flow vertical wind generator (10) for generating electricity, the generator (10) comprising:
   a. a stator assembly (12) defining a plurality of directional ducts (36A-36H), wherein the directional ducts (36A-36H) are configured to direct air passing through the ducts (36A-36H) to flow out of the directional ducts (36A-36H) in a first rotational direction (42), the stator assembly (12) also defining a central turbine void (14) between exits of the directional ducts (36A-36H);
   b. a wind turbine (16) rotatably secured within the central turbine void (14) and having a bottom surface (44), an opposed top surface (46), and a plurality of vanes (48) extending between the bottom surface (44) and the top surface (46), wherein the wind turbine (16) is configured so that the plurality of vanes (48) are positioned adjacent exits of the directional ducts (36A-36H) so that air passing out of the directional ducts (36A-36H) impacts the vanes (48) to rotate the wind turbine (16) in the first rotational direction (42), wherein the plurality of vanes (48) are constructed to extend in a width direction (52) perpendicular to an axis of rotation of the wind turbine (16) in the first rotational direction (42) from adjacent an exterior perimeter (54) of the wind turbine (16) toward a center (62) of the wind turbine (16) no greater than a distance of 25 percent of a diameter (58) of the wind turbine (16), wherein the wind turbine (16) defines an open void (60) between interior edges (64) of the plurality of vanes (48) and including the center of the wind turbine (16);
   c. an electrical generator (18) secured to the wind turbine (16) for generating electricity upon rotation of the wind turbine (16);
   d. a base truss (20) having a top surface (22) and an opposed bottom surface (24), an upper truss (26) having a top surface (28) and opposed bottom surface (30), a plurality of stators (34A-34H) secured to and extending between the top surface (22) of the base truss (20) and the bottom surface (30) of the upper truss (26) so that the plurality of stators (34A-34H) define the plurality of directional ducts (36A-36H) between the stators (34A-34H), wherein the directional ducts (36A-36H) are configured to direct wind passing through the ducts (36A-36H) across the stators (34A-34H) from an exterior perimeter (38A-38H) of the stators (34A-34H) to an interior perimeter (40A-40H) of the stators (34A-34H) to flow out exits of the directional ducts (36A-36H) in a first rotational direction (42), and so that the interior perimeters (40A-40H) of the stators (34A-34H) define the central turbine void (14);
   e. wherein at least one of the base truss (20) and the upper truss (26) comprise a plurality of geodesic truss segments (96A-96H) secured adjacent each other;
   f. wherein each truss segment (96A-96H) includes a perimeter frame (98) consisting of one or more folded frame members (100A-100E) to form the perimeter frame (98) of the geodesic truss segment (96A-96H); and,
   g. wherein the folded frame members (100A-100E) define a 3-sided channel form including a channel valley (104) defined between the 3-sides and configured to face toward a center of the geodesic truss segment (96A-96H).

2. An open-flow vertical wind generator (10) for generating electricity, the generator (10) comprising:
   a. a stator assembly (12) defining a plurality of directional ducts (36A-36H), wherein the directional ducts (36A-36H) are configured to direct air passing through the ducts (36A-36H) to flow out of the directional ducts (36A-36H) in a first rotational direction (42), the stator assembly (12) also defining a central turbine void (14) between exits of the directional ducts (36A-36H);
   b. a wind turbine (16) rotatably secured within the central turbine void (14) and having a bottom surface (44), an opposed top surface (46), and a plurality of vanes (48) extending between the bottom surface (44) and the top surface (46), wherein the wind turbine (16) is configured so that the plurality of vanes (48) are positioned adjacent exits of the directional ducts (36A-36H) so that air passing out of the directional ducts (36A-36H) impacts the vanes (48) to rotate the wind turbine (16) in the first rotational direction (42), wherein the plurality of vanes (48) are constructed to extend in a width direction (52) perpendicular to an axis of rotation of the wind turbine (16) in the first rotational direction (42) from adjacent an exterior perimeter (54) of the wind turbine (16) toward a center (62) of the wind turbine (16) no greater than a distance of 25 percent of a diameter (58) of the wind turbine (16), wherein the wind turbine (16) defines an open void (60) between interior edges (64) of the plurality of vanes (48) and including the center of the wind turbine (16);
   c. an electrical generator (18) secured to the wind turbine (16) for generating electricity upon rotation of the wind turbine (16);
   d. a base truss (20) having a top surface (22) and an opposed bottom surface (24), an upper truss (26) having a top surface (28) and opposed bottom surface (30), a plurality of stators (34A-34H) secured to and extending between the top surface (22) of the base truss (20) and the bottom surface (30) of the upper truss (26) so that the plurality of stators (34A-34H) define the plurality of directional ducts (36A-36H) between the stators (34A-34H), wherein the directional ducts (36A-36H) are configured to direct wind passing through the ducts (36A-36H) across the stators (34A-34H) from an exterior perimeter (38A-38H) of the stators (34A-34H) to an interior perimeter (40A-40H) of the stators (34A-34H) to flow out exits of the directional ducts (36A-36H) in a first rotational direction (42), and so that the interior perimeters (40A-40H) of the stators (34A-34H) define the central turbine void (14);
   e. wherein at least one of the base truss (20) and the upper truss (26) comprise a plurality of geodesic truss segments (96A-96H) secured adjacent each other; and,
   f. wherein at least one of the base truss (20) and the upper truss (26) define seams (106) between the adjacent geodesic truss segments (96A-96H), and wherein the stators (34A-34H) extending between the base truss (20) and the upper truss (26) are secured to overlie the seams (106) to strengthen the stator assembly (12).

3. The open-flow vertical wind generator (10) of claim 2, wherein the geodesic truss segments (96A-96H) are in the form of quadrilateral trapezoids (96A-96H).

4. The open-flow vertical wind generator (10) of claim 2 wherein the wind generator (10) defines a vane (48) to stator (34A-34H) ratio of a number of wind turbine (16) vanes (48) divided by a number of stators (34A-34H) that is greater than 1.25.

5. A method of assembly of an open-flow vertical wind generator (10) at an end-user site, the wind generator (10) including a stator assembly (12) defining a plurality of directional ducts (36A-36H), wherein the directional ducts (36A-36H) are configured to direct air passing through the ducts (36A-36H) to flow out of the directional ducts (36A-36H) in a first rotational direction (42), the stator assembly (12) also defining a central turbine void (14) between exits of the directional ducts (36A-36H); a wind turbine (16) rotatably secured within the central turbine void (14) and having a bottom surface (44), an opposed top surface (46), and a plurality of vanes (48) extending between the bottom surface (44) and the top surface (46), wherein the wind turbine (16) is configured so that the plurality of vanes (48) are positioned adjacent exits of the directional ducts (36A-36H) so that air passing out of the directional ducts (36A-36H) impacts the vanes (48) to rotate the wind turbine (16) in the first rotational direction (42), wherein the plurality of vanes (48) are constructed to extend in a width direction (52) perpendicular to an axis of rotation of the wind turbine (16) in the first rotational direction (42) from adjacent an exterior perimeter (54) of the wind turbine (16) toward a center (62) of the wind turbine (16) no greater than a distance of 25 percent of a diameter (58) of the wind turbine (16), wherein the wind turbine (16) defines an open void (60) between interior edges (64) of the plurality of vanes (48) and including the center of the wind turbine (16); an electrical generator (18) secured to the wind turbine (16) for generating electricity upon rotation of the wind turbine (16); the method of assembly comprising:

a. producing a plurality of stators (34A-34H), a plurality of geodesic truss segments (96A-96H) and a wind turbine (16);

b. then, transporting the plurality of stators (34A-34H), the plurality of geodesic truss segments (96A-96H) and the wind turbine (16) to the end-user installation site;

c. then, securing the plurality of truss segments (96A-96H) to each other to form at least one of a base truss (20) and an upper truss (26);

d. securing the plurality of stators (34A-34H) between the base truss (20) and the upper truss (26) to form a stator assembly (12) that defines a plurality of directional ducts (36A-36H) between the stators (34A-34H) and that defines a central turbine void (14) between interior perimeters (40A, 40B, 40G) of the stators (34A-34H);

e. then, rotatably securing the wind turbine (16) within the central turbine void (14);

f. connecting a turbine axle (72) of the wind turbine (16) to an electricity generator (18); and, g. wherein securing the plurality of stators (34A-34H) further comprises securing the plurality of stators (34A-34H) to overlie seams (60) defined between adjacent geodesic truss segments (96A-96H) of at least one of the base truss (20) and the upper truss (26).

6. The open-flow vertical wind generator (10) of claim 1, wherein the geodesic truss segments (96A-96H) are in the form of quadrilateral trapezoids (96A-96H).

7. The open-flow vertical wind generator (10) of claim 1 wherein the wind generator (10) defines a vane (48) to stator (34A-34H) ratio of a number of wind turbine (16) vanes (48) divided by a number of stators (34A-34H) that is greater than 1.25.

8. The open-flow vertical wind generator (10) of claim 1, wherein the stators (34A-34H) are non-planar stators (34A-34H).

9. The open-flow vertical wind generator (10) of claim 8, wherein the non-planar stators (34A-34H) define a minimum depth-of-bend being at least 25 percent of a width distance (92) between the exterior perimeter (38A, 38B, 38G) and interior perimeter (40A, 40B, 40G) of the non-planar stators (34A-34H), wherein the width distance (92) of the non-planar stators (34A-34H) is a shortest distance between the exterior perimeters (38A, 38B, 38G) and interior perimeters (40A, 40B, 40G) of the non-planar stators (34A-34H), and wherein the depth-of-bend defines a furthest distance of a concave surface (88) or a stator (34G) away from a plane defined along the shortest distance between the exterior and interior perimeters (38G and 40G) of the stator (34G).

10. The open-flow vertical wind generator (10) of claim 1, wherein the stator assembly (12) and wind turbine (16) define a sound-dampening void (94) between the interior perimeters (40A, 40B, 40G) of the stators (34A-34H) and the vanes (48) of the wind turbine (16), wherein a length of the sound dampening void (94) is at least 3 percent of a diameter of the central turbine void (14).

11. The open-flow vertical wind generator (10) of claim 2, wherein the stators (34A-34H) are non-planar stators (34A-34H).

12. The open-flow vertical wind generator (10) of claim 11, wherein the non-planar stators (34A-34H) define a minimum depth-of-bend being at least 25 percent of a width distance (92) between the exterior perimeter (38A, 38B, 38G) and interior perimeter (40A, 40B, 40G) of the non-planar stators (34A-34H), wherein the width distance (92) of the non-planar stators (34A-34H) is a shortest distance between the exterior perimeters (38A, 38B, 38G) and interior perimeters (40A, 40B, 40G) of the non-planar stators (34A-34H), and wherein the depth-of-bend defines a furthest distance of a concave surface (88) or a stator (34G) away from a plane defined along the shortest distance between the exterior and interior perimeters (38G and 40G) of the stator (34G).

13. The open-flow vertical wind generator (10) of claim 2, wherein the stator assembly (12) and wind turbine (16) define a sound-dampening void (94) between the interior perimeters (40A, 40B, 40G) of the stators (34A-34H) and the vanes (48) of the wind turbine (16), wherein a length of the sound dampening void (94) is at least 3 percent of a diameter of the central turbine void (14).

* * * * *